United States Patent [19]

Mekjian

[11] 4,010,653
[45] Mar. 8, 1977

[54] OVERDRIVE MECHANISM

[75] Inventor: John Mekjian, Watertown, Mass.

[73] Assignee: Jack Katz, Newton, Mass. ; a part interest

[22] Filed: May 27, 1975

[21] Appl. No.: 580,612

[52] U.S. Cl. .............................. 74/781 R; 74/805
[51] Int. Cl.² ........................................ F16H 3/44
[58] Field of Search ..................... 74/781 R, 805

[56] References Cited

UNITED STATES PATENTS

| 443,283 | 2/1936 | UK | |
|---|---|---|---|
| 2,500,447 | 3/1950 | Bitzer | 74/781 R |
| 2,510,469 | 6/1950 | Greenlee | 74/781 R |
| 2,620,899 | 12/1952 | Swift | 74/781 R X |
| 2,630,025 | 3/1953 | Lapsley | 74/781 R |
| 2,653,489 | 9/1953 | Charpentier | 74/781 R X |
| 2,762,233 | 9/1956 | Orr | 74/781 R X |

FOREIGN PATENTS OR APPLICATIONS

| 134,156 | 7/1933 | Austria | 74/781 R |
|---|---|---|---|
| 1,120,138 | 7/1956 | France | 74/781 R |
| 1,370,684 | 7/1964 | France | 74/781 R |
| 677,099 | 8/1952 | United Kingdom | 74/781 R |
| 778,671 | 7/1957 | United Kingdom | 74/781 R |
| 443,283 | 2/1936 | United Kingdom | 74/781 R |

*Primary Examiner*—Everette A. Powell, Jr.
*Attorney, Agent, or Firm*—Wolf, Greenfield & Sacks

[57] ABSTRACT

The overdrive device interconnects between the output shaft of the transmission and the drive shaft of an automobile or other motor vehicle. The device is continually operable as long as the transmission is in its drive mode and the device is of the planetary gear type.

7 Claims, 3 Drawing Figures

OVERDRIVE MECHANISM

BACKGROUND OF THE INVENTION

The present invention pertains in general to an overdrive mechanism for a motor vehicle, which mechanism couples between the output shaft of the transmission and the drive shaft of the vehicle. More paticularly, the present invention relates to an overdrive mechanism that is self-contained, does not require any electrical control lines, that is very compact and of the planetary gear type.

In the past, overdrive mechanisms have been used in motor vehicles to provide improved gasoline mileage especially at normal highway driving speeds. These mechanisms have been operated successfully, however, generally these devices have been somewhat complex and required use of certain electrical and mechanical controls.

Accordingly, one object of the present invention is to provide an improved overdrive mechanism for use on motor vehicles.

Another object of the present invention is to provide an overdrive mechanism that requires no electrical or mechanical controls.

A further object of the present invention is to provide an overdrive mechanism that is self contained and is easily adapted to existing vehicles with the only other modification being a substitution of the vehicle drive shaft.

Still another object of the present invention is to provide an overdrive mechanism that is very compact and that can be manufactured inexpensively.

Still a further object of the present invention is to provide an overdrive mechanism that is self lubricating and requires essentially no maintenance over an extremely long operating life.

SUMMARY OF THE INVENTION

To accomplish the foregoing and other objects of this invention, there is provided an overdrive mechanism for coupling between the output shaft of a standard or automatic transmission and the drive shaft of a motor vehicle. This mechanism comprises a housing that is usually provided in at least two sections and has means defining an input end and means defining and output end. The input end is suitably secured to the output of the transmission and the output end of the overdrive mechanism is secured to the drive shaft or universal joint of the drive shaft. The housing may be secured together in a suitable manner to form a unitary housing. The mechanism further comprises an input shaft driveable from the transmission shaft, means for supporting the input shaft, an output shaft for coupling to the drive shaft, and means for supporting the output shaft. The input and output shafts are respectively disposed at the input and output ends of the housing.

A sun gear which is preferably in the form of a helical gear is disposed in the housing and has means associated therewith for securing the sun gear in a non-rotatable position in the housing. A plurality of planet gears which are also preferably helical gears are supported by a common support means which maintains the planet gears in spaced relative relationship and intermeshed with the sun gear. The input shaft preferably extends through a passage in the sun gear and is secured to the common support means for the planet gears for driving this common support means. An internally toothed ring gear is suitably supported such as by bearing means so that it intermeshes with the planet gears. This ring gear is coupled to the output drive shaft and the output drive shaft is driven from the ring gear.

The arrangement is constructed to provide an increased gear ratio such as a 2:3 gear ratio between input shaft and output shaft of the overdrive mechanism. There has been found to be a 35 – 50 percent increase in mileage with the arrangement of this invention.

BRIEF DESCRIPTION OF THE DRAWINGS

Numerous other objects, features and advantages of the invention should now become apparent upon reading of the following detailed description taken in conjunction with the accompanying drawings, in which.

DETAILED DESCRIPTION

Figure 1:
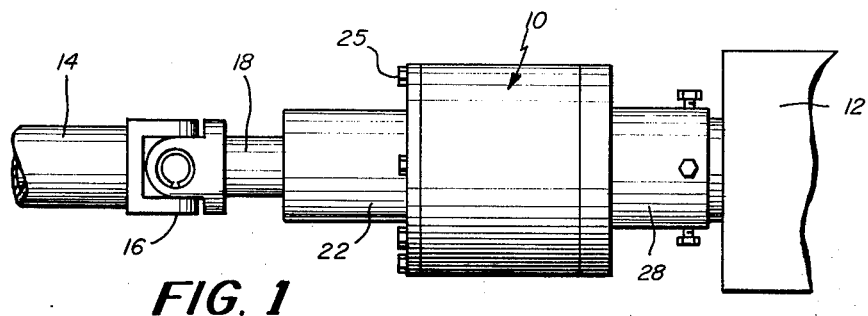
FIG. 1 shows the device of the present invention interconnected between the transmission and drive shaft of a motor vehicle.

FIG. 1 shows the overdrive device of this invention which comprises housing 10. The device is coupled between the vehicle transmission 12 and the drive shaft 14. A universal joint 16 including a splined shaft 18 may couple to one end of the device and the output shaft (not shown in FIG. 1) of the transmission 12 couples to the forward end of the device. A more detailed cross sectional view of the device is shown in FIG. 2 and a further cross sectional view taken along line 3—3 of FIG. 2 is shown in FIG. 3.

Figure 2:
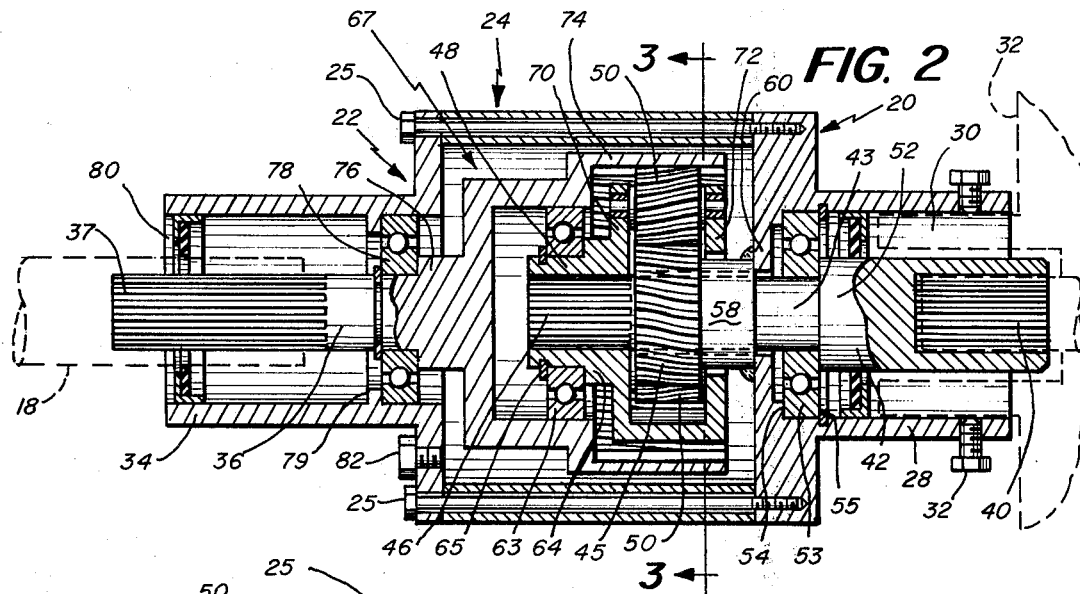
FIG. 2 is a cross sectional view of the device of the present invention.
Figure 3:
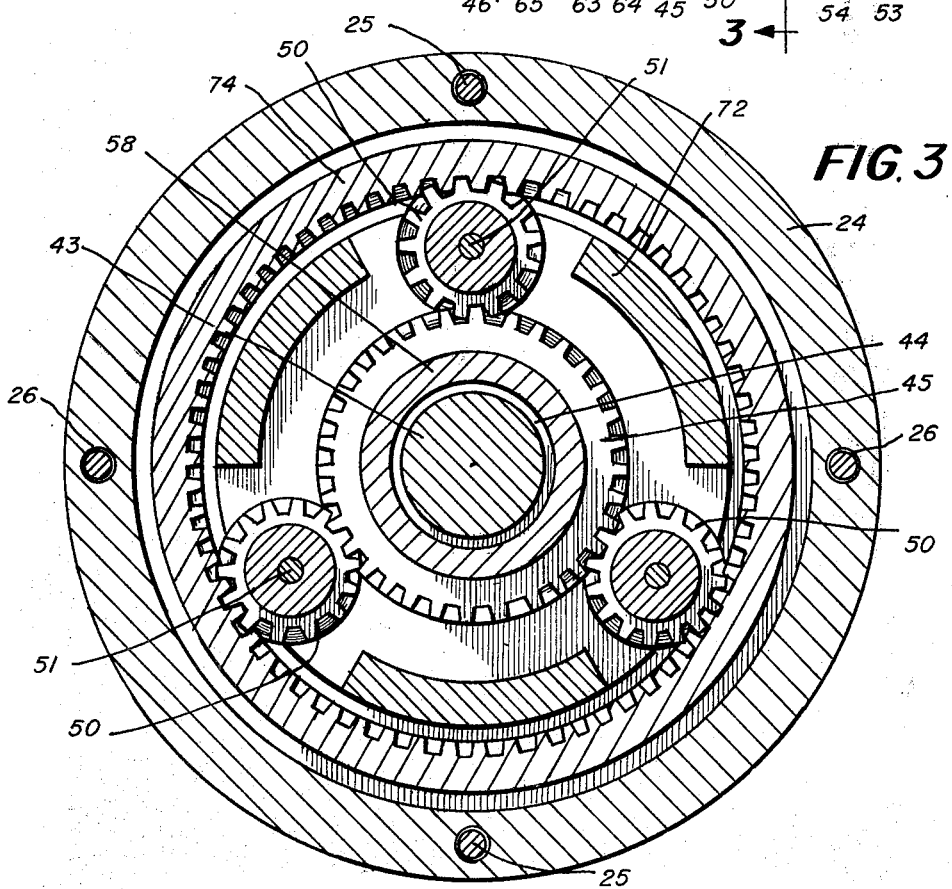
FIG. 3 is a cross sectional view taken along line 3—3 of FIG. 2.

Referring now to FIGS. 2 and 3, the housing 10 generally comprises a front section 20, a rear section 22, and a cylindrical center section 24 all of which may be constructed of a cast metal. The sections are secured together by means of four elongated bolts 25, each of which pass through elongated accommodating passages 26 in the cylindrical center section 24 of the unitary housing. The section 20 has four tapped holes for receiving the ends of the bolts 25. Section 20 also has an integral forwardly extending cylindrical collar 28 which fits over a cylindrical flange 30 of the transmission housing 32 shown in FIG. 2. The overdrive housing is secured to the flange 30 by means of a plurality of bolts 32 which pass through threaded apertures in the collar 28 and contact the flange 30. The bolts 32 may screw into a tapped recess in the flange 30 or may interlock with a depression in the flange 30.

Similarly, the end section 22 has a rearwardly extending cylindrical collar 34 with the output shaft 36 of the device extending therethrough. The shaft 36 has a splined end 37 which fits within a splined recess in the shaft 18 which comprises a part of the universal joint 16 shown in FIG. 1.

FIG. 2 shows the transmission output shaft 40 which is splined and received by a splined recess in the input shaft 42 of the overdrive device. The shaft 42 extends in a reduced diameter section 43 through a passage 44 in the sun gear 45. The shaft section 43 is splined at end 46 and is received by a splined recess in the cage housing 48. The housing 48 supports three pinion gears 50 and is driven from the input shaft 42.

The reduced diameter shaft section 43 defines a shoulder 52 against which the bearing 53 rests. The bearing 53 may be pressed into the housing section 20 and rests against a shoulder 54. The combination of this shoulder and snap ring 55 maintain the bearing 53 in place in the housing section 20. The snap ring 55 typically snaps into an annular recess in the collar 28.

The sun gear 45 is in the form of a helical gear and has a cylindrical extension or collar 58 integrally formed therewith. The collar 58 is secured, such as by welding, to an annular lip 60 of the housing section 20. Thus, the sun gear is maintained in a stationary position relative to the housing of the device.

The housing or cage 48 for the pinion gears 50, as previously mentioned, is driven from the input shaft and is shown in FIG. 2 as being supported by bearing 63 which sits against shoulder 64 of the housing and is maintained in place by means of snap ring 65. The bearing 63 may be pressed into the ring gear assembly 67.

Each of the pinions 50 is supported on a shaft 51 and the shaft is supported at either end in bushings. One of the bushings is located in the annular flange of the housing 48 and the other bushing is located in an oppositely disposed annular flange 72 comprising a part of the housing 48. The pinion gears 50 are supported for free rotation in the housing 48 and are also of the helical type. As indicated in FIG. 3, these gears are disposed intermediate the sun gear 45 and the outer ring gear 74 which comprises a part of the ring gear assembly 67. The assembly 67 actually comprises a unitary housing forming the ring gear 74 and having a series of steps terminating in the output shaft 36. The output shaft 36 has a shoulder 76 against which the bearing 78 may be pressed. A snap ring 79 holds the bearing 78 in place. At the rear end of the collar 34, there is disposed a seal 80 which prevents leakage of any lubricating fluid from the overdrive device.

The housing sections 20, 22 and 24 define a chamber in which the gears are disposed. A lubricant may be disposed in the bottom section of the housing for lubricating these gears and there is provided a plug 82 which permits a draining of the lubricant from the device. Plug 82 can also be used for filling the device or a separate plug can be used therefor.

In operation, when the input shaft 42 is driven from the output of the transmission, the housing or cage 48 is rotated therewith. The gears are all intermeshed and the sun gear is held in a stationary position. When the housing 48 is rotated the pinion gears 50 are carried around the sun gear with the rotation of the housing 48. The pinion gears must therefor rotate on their shafts as they are meshed with the sun gear. Also, since the pinion gears are meshed with the ring gear 74, they also cause the ring gear to rotate. In this arrangement, the ring gear will rotate at a faster speed than the housing 48. In the embodiment shown herein, the gears are arranged so that a 2:3 gear ratio is obtained between the input and output shafts. The gearing is also arranged so that the output shaft turns in the same direction as the input shaft. The size of the pinion gears, for example, can control the gear ratio of the device. At any given instant, the pinion teeth are considered as stationary as they are meshed with the sun gear which is stationary. The pinion, therefore, is said to be pivoting around the stationary tooth of the sun gear. If the pinion supporting shaft is moving a predetermined speed, then the outside tooth must be moving at a faster speed. That is, the outside tooth and also the ring gear with which it is meshed move faster than the housing 48. It has been found that the gasoline mileage with the use of this device increased anywhere from 35-50% in comparison to the mileage observed without the use of the device.

The device can easily be adapted to existing vehicles simply by replacing the drive shaft or shortening the drive shaft. It is noted that there are no elecrical or mechanical controls associated with the device. Further the device is construction extremely compactly. This is provided at least in part by the use of a passage in the sun gear, the specific construction of the ring gear assembly, and the interleaving of the ring gear assembly and the pinion housing.

What is claimed is:

1. An overdrive mechanism for coupling between the output transmission shaft and the drive shaft of a motor vehicle comprising;
   means defining a housing provided in at least two sections and having means defining an input end and means defining an output end,
   means for securing the sections of the housing together to form a unitary housing,
   an input shaft driveable from the transmission shaft,
   bearing means for supporting the input shaft at the input end of the housing,
   an output shaft for coupling to the drive shaft,
   bearing means for supporting the output shaft at the output end of the housing,
   a sun gear disposed in the housing and having means for securing the sun gear in a non-rotatable position,
   a plurality of pinion gears,
   means for commonly supporting the pinion gears in spaced relative relationship and intermeshed with the sun gear,
   means securing the input shaft to the means for commonly supporting for driving the later when the input shaft is driven,
   an integrally toothed ring gear,
   means for supporting the ring gear with its teeth intermeshed with said pinion gears,
   and means securing the ring gear to the output shaft whereby the output shaft is driven from the ring gear,
   said sun gear having a passage therethrough for receiving the input shaft which is supported by the input shaft bearing means on one side of the sun gear extends through the sun gear and connects to the common support means on the other side of the sun gear,
   said sun gear having a gear section and a collar extending axially therefrom,
   said housing having a wall extending normal to the axis of the sun gear and input shaft and defining an aperture of a diameter large enough to accommodate the input shaft but smaller than the diameter of the collar of the sun gear,
   said collar contacting the normal wall of the housing about a circular locus and being secured thereto by a weld between the collar and the normal wall.

2. An overdrive mechanism as set forth in claim 1 wherein said sun gear, pinion gears and ring gear are all worm-type gears.

3. An overdrive mechanism as set forth in claim 2 wherein said housing comprises three sections including a cylindrical center section, a front section having a collar and a rear section having a collar.

4. An overdrive mechanism as set forth in claim 3 wherein said input shaft support means comprises a bearing disposed in the front collar and said output shaft support means comprises a bearing disposed in the rear collar.

5. An overdrive mechanism as set forth in claim 4 wherein said ring gear, output shaft and means securing the ring gear to the output shaft comprise a unitary piece defining a chamber for receiving the pinion gears and sun gear.

6. An overdrive mechanism as set forth in claim 5 wherein said means for supporting the ring gear includes a bearing disposed between the ring gear and means for commonly supporting.

7. An overdrive mechanism for coupling between the output shaft of the transmission and the drive shaft of a motor vehicle comprising;
- a housing including an input section having a collar defining an input end, a center section defining a main chamber and an output section having a collar defining an output end,
- a plurality of elongated bolts for holding the three sections of the housing together to form a unitary housing,
- an input shaft extending through the input collar and extending into the chamber,
- bearing means secured in the input section of the housing for supporting the input shaft,
- a sun gear having worm teeth and a collar for securing the sun gear in a stationary position,
- said sun gear having a passage therethrough for accommodating the input shaft which extends from the input collar through the sun gear to the other side of the sun gear,
- a plurality of pinion gears,
- a support cage for commonly supporting the pinion gears in spaced relative relationship about and intermeshed with the sun gear,
- each pinion gear having helical teeth and having means for supporting the gear in free rotation in the cage,
- said cage receiving one end of the input shaft on said other side of the sun gear with the input shaft interlocked rotationally with the cage so that the cage rotates with the input shaft,
- a ring gear structure having means defining a ring gear having internal helical teeth that intermesh with and extend about the pinion gears, an output shaft that extends through the output collar and means interconnecting the output shaft and ring gear,
- bearing means associated with the output section of the housing for supporting the output shaft,
- and bearing means supporting between the ring gear structure and the cage,
- said input section defining a shoulder for limiting the position of the bearing means and means for locking the bearing into position,
- said center section of said housing having elongated passages for receiving the elongated bolts and having a cylindrical shape,
- said input shaft comprising two sections of different diameter defining a shoulder therebetween against which the bearing means contacts,
- said collar of the sun gear being integrally formed with the sun gear,
- the input section of said housing having a wall extending normal to the axis of the sun gear and input shaft and defining an aperture of a diameter large enough to accommodate the input shaft but smaller than the diameter of the collar of the sun gear,
- said collar contacting the normal wall of the housing about a circular locus and being secured thereto by a weld between the collar and normal wall,
- said cage having a core portion for receiving the input shaft with the core and input shaft being splined in a pinion gear supporting portion defining compartments for the pinion gears,
- and wherein the gear structure has a stepped section defining with the ring gear a compartment in which the cage and sun gear are disposed.

* * * * *